United States Patent [19]

Lu

[11] Patent Number: 5,454,298
[45] Date of Patent: Oct. 3, 1995

[54] APPARATUS FOR MESHING DEHYDRATING AND DESICCATING FOOD PRODUCTS

[76] Inventor: Tsai-Chuan Lu, No. 560, Dong-Yi Rd., Chia-Yi City, Taiwan

[21] Appl. No.: 381,501

[22] Filed: Jan. 31, 1995

[51] Int. Cl.⁶ .............................. A23L 3/16; B02C 17/16; B01F 7/02; B01F 15/06
[52] U.S. Cl. .................. 99/483; 99/348; 99/472; 99/516; 99/510; 241/172; 241/101.8; 366/147; 366/224; 366/293; 366/172.1; 366/325.1
[58] Field of Search .................. 99/348, 450, 467, 99/472, 483, 516, 536, 509–511, 357; 366/139, 144, 147, 168, 172, 173, 224, 234, 293, 309, 325; 241/65, 171, 172, 101.01, 101.8

[56] References Cited

U.S. PATENT DOCUMENTS

| | | | |
|---|---|---|---|
| 2,869,840 | 1/1959 | Schmidt | 99/348 |
| 3,682,091 | 8/1972 | Bredeson | 99/348 |
| 3,946,996 | 3/1976 | Gergely | 366/325 |
| 4,108,385 | 8/1978 | Funk | 241/172 |
| 4,169,680 | 10/1979 | Littlefield | 366/309 |
| 4,651,935 | 3/1987 | Samosky et al. | 241/172 |
| 4,733,607 | 3/1988 | Star et al. | 99/483 |
| 4,784,336 | 11/1988 | Lu | 241/65 |
| 4,809,597 | 3/1989 | Lin | 99/483 |
| 4,989,504 | 2/1991 | Jay | 366/325 |
| 5,351,609 | 10/1994 | Muntener | 99/472 |
| 5,353,696 | 10/1994 | Stadelmann et al. | 366/139 |

*Primary Examiner*—Timothy F. Simone
*Attorney, Agent, or Firm*—Morton J. Rosenberg; David I. Klein

[57] ABSTRACT

Apparatus to mashing and to dehydrate food product includes a base portion, a housing, a roler and a mixer driven by driving means. During operating the dehydrator, the roller will rotate to produce a centrifuging force which forces water preserved in the food product to be expelled. The mixer will rotate with the roller too which mashes the food product. An air inlet guides hot air into the roller to dry the mashed food product for preservation purpose.

1 Claim, 3 Drawing Sheets

APPARATUS FOR MESHING DEHYDRATING AND DESICCATING FOOD PRODUCTS

BACKGROUND OF THE INVENTION

This invention relates to a food apparatus, and more particular to an apparatus combined meshing, dehydrating, and desiccating food products.

Many of the food products produced by factory are in a large size for storage and shipment convenience. However, in order to preserve these products for a certain period of time, the food products need to be dehydrated and to be desiccated.

The current procedure of food products is to process independently that the dehydrating, the meshing, and the desiccating procedures are processed by three different apparatus. These not only increase the cost but also increase the manhour.

SUMMARY OF THE INVENTION

It is the primary object of the present invention to provide an apparatus for meshing, dehydrating, and desiccating food products which is a three-in-one apparatus that saves time in process.

It is an other object of the present invention to provide an apparatus for meshing, dehydrating, and desiccating food products which is cost effectiveness both in process and in manhour.

It is a further object of the present invention to provide an apparatus for meshing, dehydrating, and desiccating food products which is easy to operate.

DETAILED DESCRIPTION OF THE PREFERRED EMBODIMENT

Figure 1:
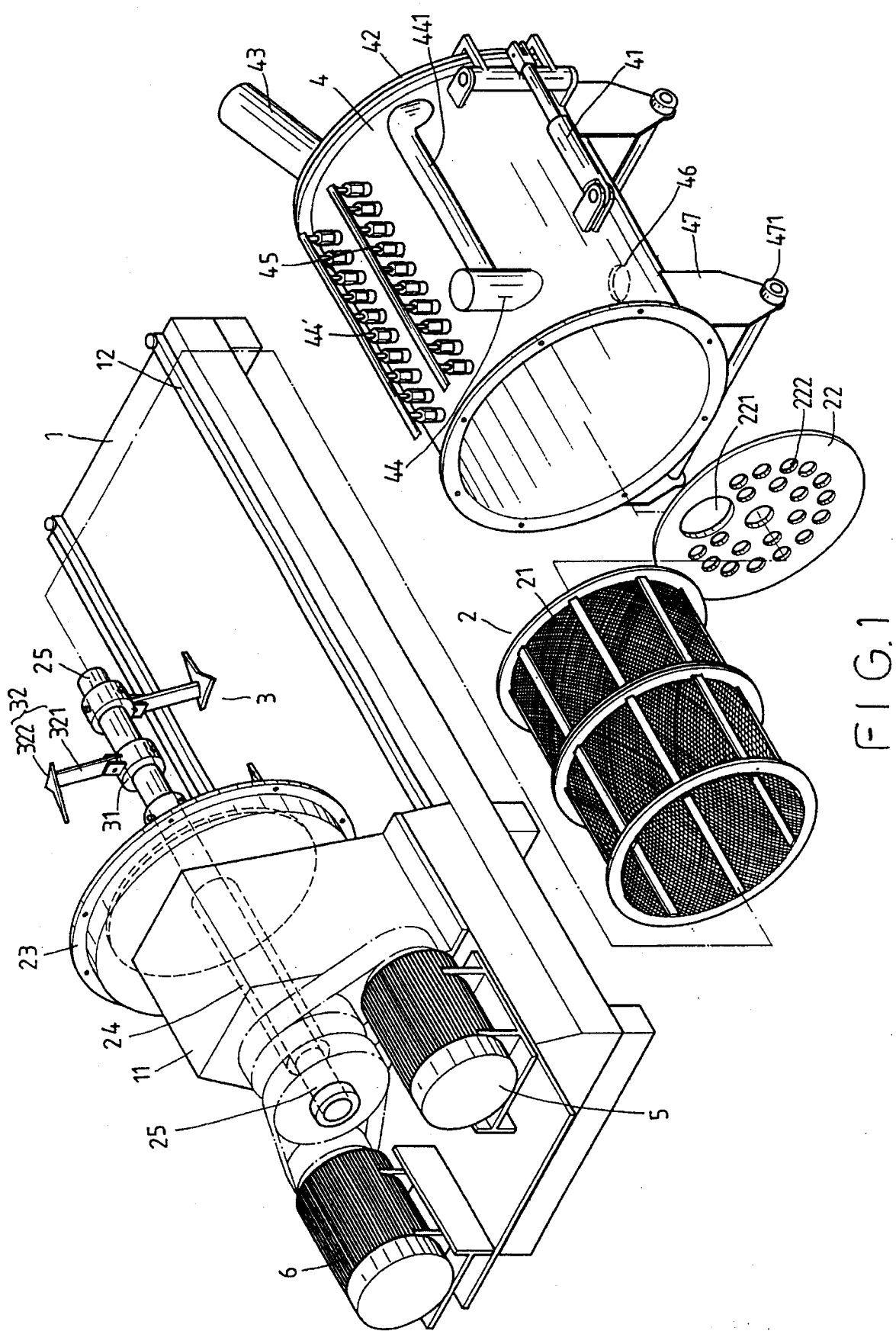
FIG. 1 is an exploded view of the present invention.
Figure 2:
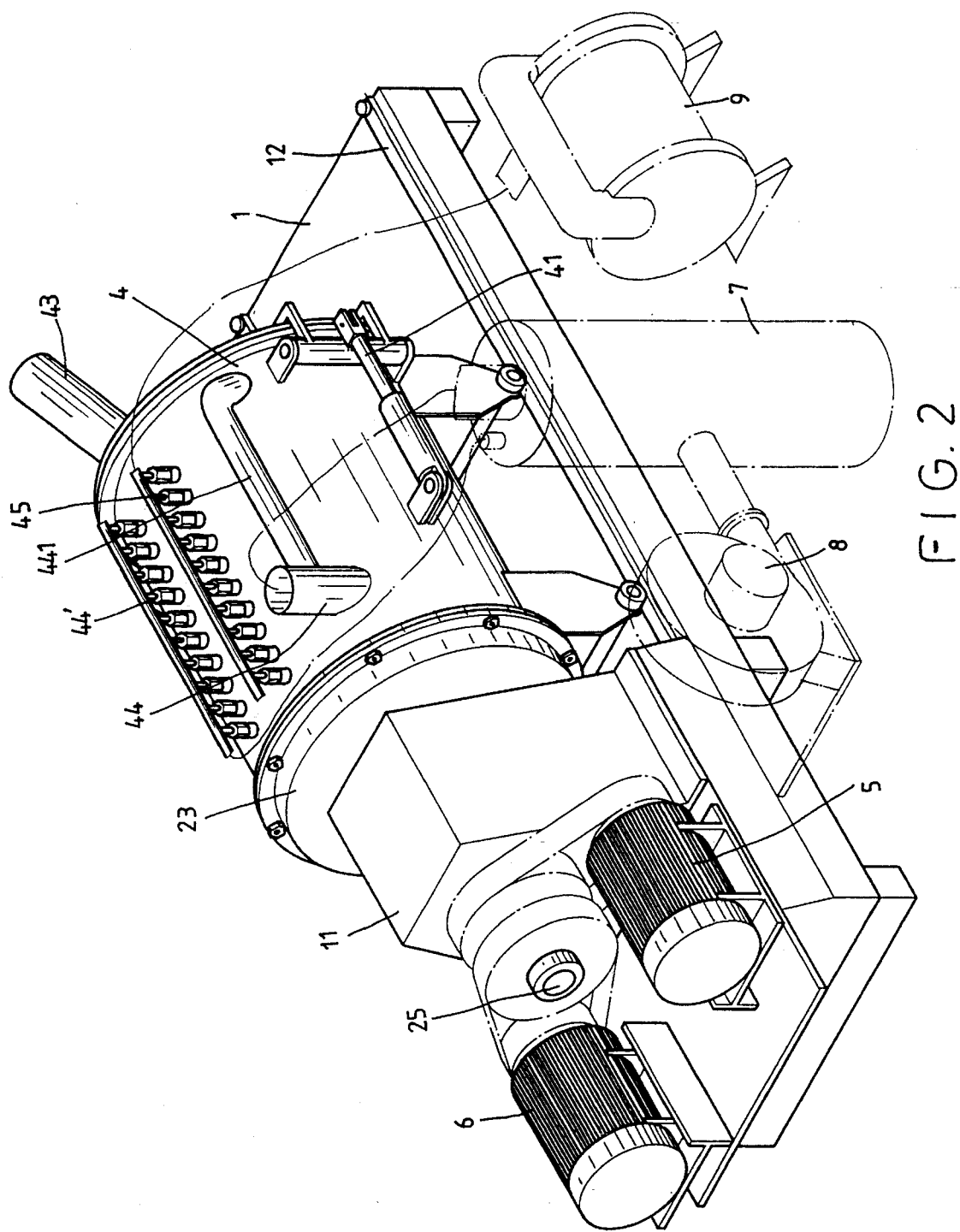
FIG. 2 is a perspective view of the present invention.
Figure 3:
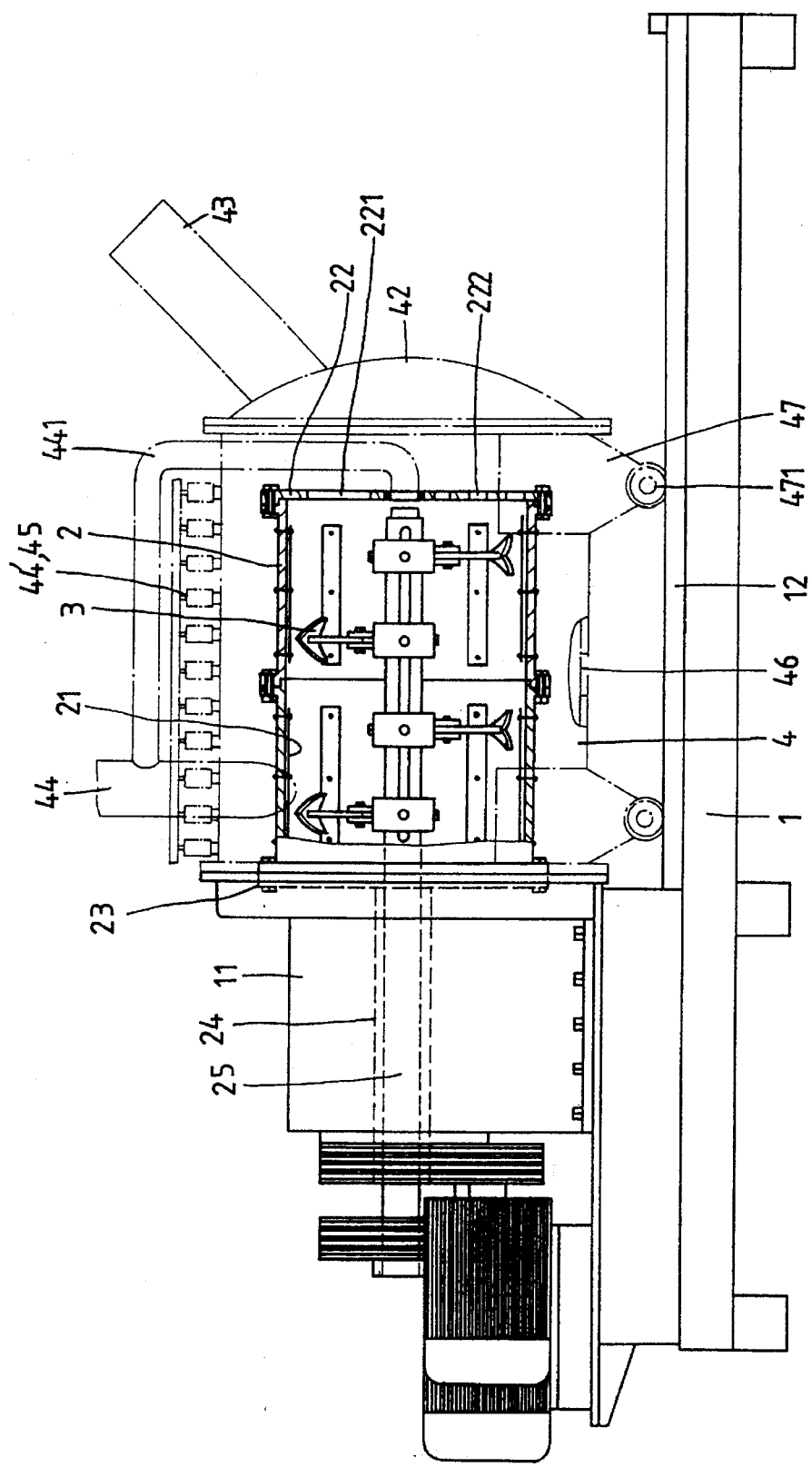
FIG. 3 is a cross-sectional view of the present invention.

Referring now to FIGS. 1 through 3, wherein the showings are for the purpose of illustrating a preferred embodiment only and not for the purpose of limiting the inventive concept illustrated therein. FIG. 1 comprises a base portion 1 having a pair of spaced and parallel horizontally situated guiding tracks 12 and a supporting frame 11 secured to one end of the base portion 1, a roller 2, a masher 3, a housing 4, a pair of motors 5 and 6, a heating element 7, a blower 8, and a pump 9 forming the present invention.

The roller 2 includes a screen 21, a first cover 22 detachably attached to one end thereof. The cover 22 has a large hole, or feeder 221 adopted to feed food product into the roller 2 therefrom, and a plurality of small apertures 222. The other end of the roller 2 is inserted into the supporting frame 11 and covered by a second cover 23 rotatably attached to the supporting frame 111. A first gear 24 shaft, supported by the supporting frame 11 in a conventional manner, has one end connected to a first motor 5 through a belt and the other end of which is inserted through the supporting frame 11 and secured to the second cover 23. A second gear 25 shaft, supported also by the supporting frame 11 in the conventional manner, also has one end connected to the second motor 6 by a belt and the other end of which is inserted through the supporting frame 11 and into the roller 2. The first motor 5 and the second motor 6 are designed in a reversed phases which link the first gear shaft 24 and the second gear shaft 25 to rotate in a reversed directions.

The masher 3 comprises a pair of blade assemblies 32 which includes a blade rod 321 and a blade 322. Both blade assemblies include a sleeve 31 which are sleeved onto the second gear shaft 25 and are secured to the end of the second gear shaft 25 extending into the roller 2 and are positioned in an opposite directions.

The housing 4 is cylindrical in shape having a door 42 at one end controlled by a hydraulic cylinder 41 to open and to close, an opening at the opposite end adopted for the roller 2 to insert therethrough, a pipe 43 extending outwardly therefrom to drawn air from the housing 4, a main pipe 44 on the housing 4 adopted to drawn hot air from the heating element 7 into the housing 4 having a lateral pipe 441 having one end extending from the main pipe 44 and the other end of the lateral pipe 441 is extending downwardly into a central aperture of the apertures 222 of the roller 2 to blow hot air directly on the food products in process. A plurality of subsidiary pipe 44' are formed have one end of each connected to the heating element 7. The other ends of the subsidiary pipes 44' are extending into the housing 4. A plurality of water pipes 45 are also formed on the housing having one end of each connected to the pump 9 and the other end of each extending into the housing 4. An orifice 46 is formed at a bottom portion of the housing 4 adopted to drawn waste water out of the housing 4. A plurality of legs 47 extend from the bottom portions of the housing 4. Wheels 471 are connected to each leg 47 of the housing 4 to support the housing above the base portion 1 and the wheels 471 permit movement of the housing 4 along the guide tracks 12.

In operation, the roller 2 is secured to the second cover 23 with food product placed in the roller 2. The housing 4 slides forward along the guide track 12 to seal the roller 2 therein. The motors 5 and 6 are actuated which drive the gear shafts 24 and 25 to spin in a reversed phase which link the roller 2 and the masher 3 to spin in a reversed directions, simultaneously. The spinning of the roller 2 will produce a centrifuging force which drawn water outwardly from the food product and expelled from the orifice 46. The spinning of the blade assemblies 32 will chop the food product into small particles or into powder. Meanwhile, the heating element 7 blows hot air into the housing 4 through the main pipe 44 and subsidiary pipes 44' to desiccate the powder. The pump 9 will pump the pressurized water into the roller 2 through the water pipe 43 and through the housing 4 when necessary.

Upon the completion of the operation, the housing 4 is slid along the guide tracks 12 backwardly to expose the roller 2 and the first cover 22 of the roller 2 is rotated to bring the feeder 221 to the lowermost position in order to remove the processed food product.

I claim:

1. An apparatus for meshing, dehydrating, and desiccating food products including a base portion, a roller, blade assemblies, a cylindrical housing, and a driving means, and the improvements comprising:

said base portion having a supporting frame secured on one end of said base portion, and at least two guide tracks on said base portion;

said roller having a screen on the outer periphery, a first cover at one end having a large hole or feeder and a plurality of small holes thereon, the other end of said roller being secured to a second cover and having at least one blade assembly secured to one end of a first gear shaft extending into said roller, said second cover being rotatably attached to one end of a second gear shaft, the other ends of said first gear shaft and said second gear shaft being secured and driven to a pair of motors of said driven means;

said cylindrical housing having a door at one end controlled by a cylinder to close and open said housing, a pipe extending from one end adapted to expel air therefrom, a main pipe on top of said housing and a lateral pipe having one end extending from said main pipe and the other end of the same inserted into said roller to blow hot air into said housing and said roller, a plurality of subsidiary pipes secured on top of said housing also providing hot air into said housing, a plurality of water pipes having one end of which connected to a pump and the other end of said water pipe extending into said housing, legs being formed at bottom portion and wheels rotatably connected to each leg permitting said housing to slide along said guide tracks of said base portion;

whereby rotation of said first gear shaft and said second gear shaft link said roller and said blade assemblies to rotate, simultaneously.

* * * * *